United States Patent [19]

Tochihara et al.

[11] Patent Number: 5,395,434
[45] Date of Patent: Mar. 7, 1995

[54] INK, INK-JET RECORDING METHOD, AND INK-JET RECORDING APPARATUS

[75] Inventors: Shinichi Tochihara, Hadano; Hitoshi Sugimoto, Kawasaki; Shinichi Sato; Fumihiro Gotoh, both of Yokohama; Masaya Uetuki, Kawasaki, all of Japan

[73] Assignee: Canon Kabushiki Kaisha, Tokyo, Japan

[21] Appl. No.: 87,069

[22] Filed: Jul. 7, 1993

[30] Foreign Application Priority Data

Jul. 10, 1992 [JP] Japan ............... 4-183992
Jul. 10, 1992 [JP] Japan ............... 4-183993
Mar. 17, 1993 [JP] Japan ............... 5-081164

[51] Int. Cl.$^6$ ............................................. C09D 11/02
[52] U.S. Cl. ..................... 106/22 R; 106/20 D; 106/22 H
[58] Field of Search ............... 106/22 R, 22 H, 20 D; 346/1.1, 46

[56] References Cited

U.S. PATENT DOCUMENTS

| | | | |
|---|---|---|---|
| 4,170,482 | 10/1979 | Mansukhani | 106/20 D |
| 4,196,007 | 4/1980 | Mansukhani | 106/22 B |
| 4,409,040 | 10/1983 | Tabayashi et al. | 106/22 H |
| 4,508,570 | 4/1985 | Fujii et al. | 106/20 D |
| 4,853,036 | 8/1989 | Koike et al. | 106/20 D |
| 4,923,515 | 5/1990 | Koike et al. | 106/22 |
| 4,957,553 | 9/1990 | Koike et al. | 106/20 D |
| 5,019,166 | 5/1991 | Schwarz | 106/22 E |
| 5,078,790 | 1/1992 | Tochihara et al. | 106/20 |
| 5,080,716 | 1/1992 | Aoki et al. | 106/20 |
| 5,098,476 | 3/1992 | Baker | 106/22 R |
| 5,099,255 | 3/1992 | Koike et al. | 346/1.1 |
| 5,101,217 | 3/1992 | Iwata et al. | 346/1.1 |
| 5,116,409 | 5/1992 | Moffatt | 106/22 R |
| 5,125,969 | 6/1992 | Nishiwaki et al. | 106/22 |
| 5,131,949 | 7/1992 | Tochihara et al. | 106/20 |
| 5,132,700 | 7/1992 | Tochihara et al. | 346/1.1 |
| 5,135,571 | 8/1992 | Shirota et al. | 106/22 |
| 5,137,570 | 8/1992 | Nishiwaki et al. | 106/22 |
| 5,196,057 | 3/1993 | Escano et al. | 106/22 R |
| 5,213,613 | 5/1993 | Nagashima et al. | 106/20 R |

FOREIGN PATENT DOCUMENTS

| | | |
|---|---|---|
| 0272936 | 6/1988 | European Pat. Off. . |
| 0404494 | 12/1990 | European Pat. Off. . |
| 0447896 | 9/1991 | European Pat. Off. . |
| 0483610 | 5/1992 | European Pat. Off. . |
| 55-29546 | 3/1980 | Japan . |
| 56-5871 | 1/1981 | Japan . |
| 56-57862 | 5/1981 | Japan . |
| 2199041 | 6/1988 | United Kingdom . |

OTHER PUBLICATIONS

Derwent Abstract (WPI) No. 84-103558 with respect to Japanese Patent Document No. 59-045372 (Sep. 7, 1982).

Derwent Abstract (WPI) No. 82-98521E with respect to Japanese Patent Document No. 57-164169 (Apr. 3, 1981).

Derwent Abstract (WPI) No. 82-10725E with respect to Japanese Patent Document No. 56-167775 (May 29, 1980).

*Primary Examiner*—Helene Klemanski
*Attorney, Agent, or Firm*—Fitzpatrick, Cella, Harper & Scinto

[57] ABSTRACT

Provided is an ink for ink-jet recording, comprising a dye, water, and the components (a), (b), and (c) below:
(a) at least one surfactant selected from the group consisting of higher alcohol-ethylene oxide adducts represented by General Formula [1], alkylphenol-ethylene oxide adducts represented by General Formula [2], ethylene oxide-propylene oxide copolymers represented by General Formula [3], and acetylene glycol-ethylene oxide adducts represented by General Formula [4], at a content of from 0.1 to 20% by weight;

$$R-O-(CH_2CH_2O)_n-H \qquad 1$$

where R is alkyl, and n is an integer;

(Abstract continued on next page.)

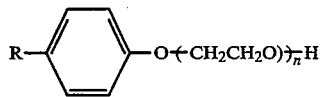
[2]
where R is alkyl, and n is an integer;
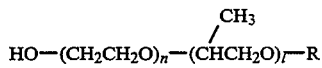
(3)
where R is alkyl or hydrogen, and n and l are respectively an integer;
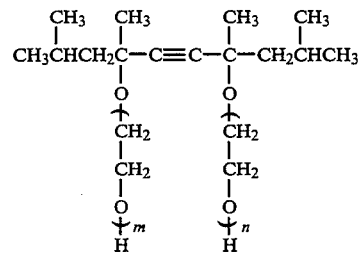
[4]
where m and n are respectively an integer;
(b) thiodiglycol; and
(c) urea or a derivative thereof.
31 Claims, 5 Drawing Sheets

INK, INK-JET RECORDING METHOD, AND INK-JET RECORDING APPARATUS

BACKGROUND OF THE INVENTION

1. Field of the invention

The present invention relates to an ink which provides excellent color recording on plain paper such as wood-free paper, medium-quality paper, bond paper, and paper for copying. The present invention also relates to an ink-jet recording method, and an ink-jet recording apparatus employing the above ink.

2. Related Background Art

Personal computers including desk-top types, lap-top types, and book types have come to employ a color display unit in recent years. Software is also directing to color representation. Consequently, printers are changing from monocolor types to color types.

Among recording methods employed by such printers, ink-jet recording is attracting attention. In ink-jet recording, ink droplets are ejected and are attached to a recording medium, such as paper sheets, converted paper sheets, plastic films, and cloths without contact of a recording head to the recording medium. The ink-jet recording method is advantageous in that noise is not produced because of non-contact of the recording head with the recording medium, and high speed printing and color recording is practicable.

In the ink-Jet recording method, it is required that (1) ink does not cause running of ink at the recorded portion on the recording medium, (2) ink is sufficiently stable during storage, and (3) the safety is high. In color ink-jet recording, it is further required that (4) mixing(or bleeding) of different colors of inks caused by unfixed ink droplets does not occur on contact of different color inks on a recording medium, (5) a solid color portion is uniform in color, and (6) failure of ink ejection does not occur after interruption of ink ejection (first-ejection difficulty), since limited colors of inks are more frequently used in color printing, unlike monocolor printing.

However, conventional inks per se are not usable as inks for color recording because they cause serious bleeding and do not give high-quality images. Presumably, the bleeding is caused by the fact that the ink is dotted before the previously dotted different color of ink has been sufficiently fixed. Coated paper, which has high ink-absorbing ability, is used for color recording in order to prevent the bleeding. Further, for printing on plain paper such as paper for copying and bond paper, a printing method reflecting upon the fixing time of ink is proposed in which ink is dotted after the previously dotted ink droplet has been fixed. In such a printing method, the speed of the paper feed has to be slowed down disadvantageously, thereby the printing time becomes longer irrespectively of the ink-dotting method. Therefore, high speed printing, which is characteristic of ink-jet recording, cannot be practised with such a printing method.

To shorten the fixing time, Japanese Patent Application Laid-Open No. 55-29546 discloses a method in which a surfactant is incorporated into ink in a larger amount than usual and thereby the ink seems to become dry instantaneously owing to the increased penetration power of ink afforded by the surfactant. However, the simple addition of a surfactant in a larger amount as above cannot prevent mixing of different colors of inks at the border of colors even though it improves the ink fixation. Moreover, it augments penetration of ink toward the back face of the paper, which lowers color density on the paper face, or causes nonuniform dyeing of a fiber layer on the paper surface, resulting in irregularity of color density in solid printing area and deterioration of image quality.

Furthermore, feathering and ink fixation on a plain paper are improved by use of strongly alkaline ink (see Japanese Patent Application Laid-Open No. 56-57862, etc.), or by use of a specific kind of ink (see Japanese Patent Application Laid-Open No. 56-5871, etc.). These inks, however, do not always prevent bleeding satisfactorily, and even in the case where the bleeding is relatively slight, the feathering is conspicuous (not satisfying the aforementioned requirement (1) of the prior art) or ejection failure is liable to occur (not satisfying the aforementioned requirement (6) of the prior art). As above, no color ink has been obtained which satisfies all the above requirements and gives high quality of an image with high speed on plain paper.

SUMMARY OF THE INVENTION

The present invention intends to provide an ink for ink-jet recording which is capable of forming a color image of high quality at high and uniform color density on a usual recording medium such as plain paper without feathering or ink-bleeding, and especially without mixing of different colors of inks at the color border.

The present invention also intends to provide an ink-jet recording method, and an ink-jet recording apparatus employing the above ink.

According to a first aspect of the present invention, there is provided an ink for ink-jet recording which contains a dye and water, and further comprises the components (a), (b), and (c) below:

(a) at least one surfactant selected from the group consisting of higher alcohol-ethylene oxide adducts represented by General Formula [1], alkylphenol-ethylene oxide adducts represented by General Formula [2], ethylene oxide-propylene oxide copolymers represented by General Formula [3], and acetylene glycol-ethylene oxide adducts represented by General Formula [4], at a content of from 0.1 to 20% by weight based on the total weight of the ink;

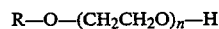

$$R—O—(CH_2CH_2O)_n—H \quad [1]$$

where R is alkyl, and n is an integer;

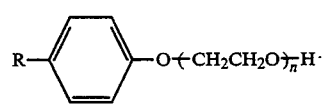

where R is alkyl, and n is an integer;

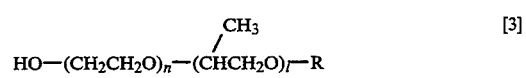

where R is alkyl or hydrogen, and n and l are respectively an integer;

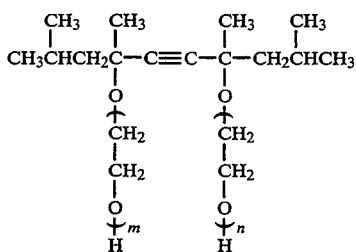

[4]

where m and n are respectively an integer;

(b) thiodiglycol; and (c) urea or an derivative thereof.

According to a second aspect of the present invention, there is provided an ink-jet recording method which conducts recording on a recording medium with droplets of ink, which comprises dye, water, and the aforementioned components (a), (b), and (c).

According to a third aspect another aspect of the present invention, there is provided a color ink-jet recording method which conducts recording by ejecting droplets of inks of two or more colors to adjacent or superposed positions on a recording medium, using the ink comprising a dye, water and the aforementioned components (a), (b), and (c).

According to a fourth aspect of the present invention, there is provided an ink which comprises a dye, a water-soluble organic solvent, water, and a compound of the formula;

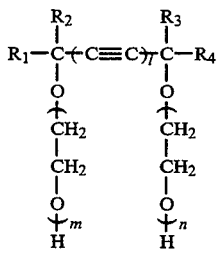

[5]

where $R_1$, $R_2$, $R_3$, and $R_4$ are respectively hydrogen, an alkyl or alkenyl group of 1 to 4 carbon atoms, or a substituted or unsubstituted phenyl group; and m+n is ranging from 0 to 50; and l is a number of 2 or more.

According to a fifth aspect of the present invention, there is provided an ink-jet recording method which conducts recording with droplets of ink on a recording medium, using the ink comprising a dye, water-soluble organic solvent, water, and a compound represented by General Formula [5] above.

According to a sixth aspect of the present invention, there is provided a color ink-jet recording method which conducts recording by ejecting droplets of ink of two or more colors to adjacent or superposed positions on a recording medium, using the ink comprising a dye, water and the aforementioned compound represented by General Formula [5] above.

According to a seventh aspect of the present invention, there is provided a recording unit comprising an ink container portion for holding ink and a head for ejecting the ink as ink droplets, in which the ink is the one specified in the above first or fourth aspect of the present invention.

According to a eighth aspect of the present invention, there is provided an ink cartridge comprising an ink container portion for holding ink, in which the ink is the one specified in the above first or fourth aspect of the present invention.

According to ninth aspect of the present invention, there is provided an ink-jet recording apparatus comprising the recording unit of the seventh aspect of the present invention, wherein the ink of the above first or fourth aspect of the present invention is employed.

According to a tenth aspect of the present invention, there is provided an ink-jet recording apparatus, comprising an ink cartridge of the eighth aspect of the present invention, and a recording head.

According to an eleventh aspect of the present invention, there is provided a color ink-jet recording method in which droplets of two or more color inks are ejected in accordance of pulse signal to adjacent or superposed positions on a recording medium, and in which the ink comprises a nonionic surfactant in an amount of from 1.0 to 20.0% by weight, the ink ejected for one pulse is in an amount of from 10 to 70 pl, and the feathering rate (A) defined by Equation [I] is in the range of from 2.5 to 3.5:

$$A = B/C \qquad [I]$$

where B is a diameter (μm) of a dot formed on plain paper, and C is a diameter (μm) of the ejected ink droplet.

According to a twelfth aspect of the present invention, there is provided color ink-jet recording apparatus which conducts recording by ejecting droplets of two or more color inks onto adjacent or superposed positions on a recording medium, said apparatus comprises a recording means for conducting recording mode, by use of an ink containing a nonionic surfactant in an amount of from 1.0 to 20.0% by weight, by ejecting the ink for one pulse in an amount of from 10 to 70 pl to form ink dots at the feathering rate (A) defined by Equation [I] is in the range of from 2.5 to 3.5:

$$A = B/C \qquad [I]$$

where B is a diameter (μm) of a dot formed on plain paper, and C is a diameter (μm) of the ejected ink droplet.

DESCRIPTION OF THE PREFERRED EMBODIMENT

Figure 1:
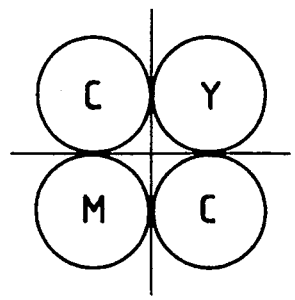
FIG. 1 shows an example of the pattern of dotting of different color inks.

The inventors of the present invention have studied comprehensively a method of color image formation which does not causes bleeding of ink and gives a uniform color image without irregularity of colors. As the result, it has been found as a first invention that an ink containing the components (a), (b), and (c) below is extremely effective:

(a) at least one surfactant selected from the group consisting of higher alcohol-ethylene oxide adducts represented by General Formula [1], alkylphenol-ethylene oxide adducts represented by General Formula [2], ethylene oxide-propylene oxide copolymers represented by General Formula [3], and acetylene glycol-ethylene oxide adducts represented by General Formula [4], at a content of from 0.1 to 20% by weight;

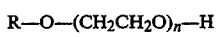

R—O—(CH$_2$CH$_2$O)$_n$—H   [1]

where R is alkyl, and n is an integer;

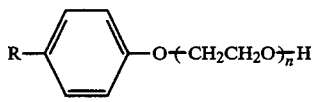

[2]

where R is alkyl, and n is an integer;

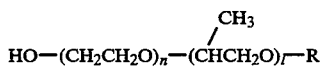

[3]

HO—(CH$_2$CH$_2$O)$_n$—(CHCH$_2$O)$_l$—R
                          \
                           CH$_3$ where R is alkyl or hydrogen, and n and l are respectively an integer;

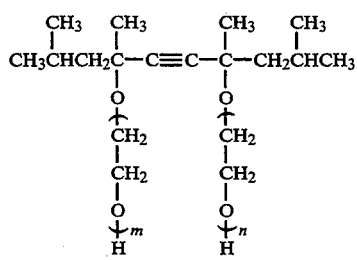

[4]

where m and n are respectively an integer;

(b) thiodiglycol; and (c) urea or a derivative thereof.

As the further result of the study, it has been found as a second invention that an ink comprising the compound represented by General Formula (5) below is extremely effective:

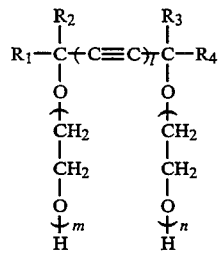

[5]

where R$_1$, R$_2$, R$_3$, and R$_4$ are respectively hydrogen, an alkyl or alkenyl group of 1 to 4 carbon atoms, or a substituted or unsubstituted phenyl group; and m+n is ranging from 0 to 50; and l is a number of 2 or more.

The inks of the first invention and the second invention are effective for formation of uniform images without bleeding or color irregularity presumably from the reasons below.

The most important factor which affects prevention of ink bleeding and uniformity of color of recorded images is considered to be the wettability of a recording medium by the ink, or a wetting power of the ink on the recording medium. Among the recording media, plain paper especially has fibers exposed on the recording surface, and the fiber density on the surface is not uniform. At the portion where the fiber density is high, the ink fixation is slow, whereby ink bleeds or the color of an image becomes irregular. The ink which has a sufficient wetting power is considered to be fixed uniformly irrespectively of the paper fiber density, and to be free from bleeding and color irregularity. Further, the ink which has excellent wetting power is considered to form precisely circular dots with uniformity of color, thereby providing images of higher quality.

The first invention of the present invention will be described in detail.

The wetting power of the ink relates closely to the interaction between the ink and the recording material at the interface. Addition of a surfactant generally decreases the interfacial tension between the ink and the recording medium, and improves the wetting power of the ink. In particular, the nonionic surfactant having an ethylene oxide chain as the component (a) of the first invention, when incorporated in the ink, the hydrophilic ethylene oxide portion of the surfactant presumably orients toward the recording medium to give a specific uniform wettability. On the contrary, an ionic surfactant, which has a hydrophilic portion which has less affinity with the recording medium than the nonionic surfactant, does not exhibit such effect.

The ethylene oxide addition type nonionic surfactant in the present first invention is preferably added in an amount of from 0.1 to 20%, more preferably from 0.1 to 5% by weight based on the weight of the ink. The wetting power is not sufficient at the amount of surfactant of less than 0.1% by weight, while, addition of the surfactant in an amount exceeding 20% by weight does not greatly improve the wetting property, and is disadvantageous in production cost and ink reliability.

The addition number of the ethylene oxide unit, the hydrophilic portion, in the ethylene oxide addition type nonionic surfactant in the present first invention is preferably in the range of from 4 to 20, more preferably from 4 to 10 in terms of "n" or "n+m" in consideration of the affinity of the ethylene oxide moiety with the recording medium and orientation thereon. At the value of "n" or "n+m" of less than 4, the solubility of the surfactant is not sufficient to achieve the effect of the present invention, while at the value of more than 20, the excessive ethylene oxide is not necessarily effective and leads to slightly unstable ink ejection.

The medium for the aforementioned ethylene oxide addition type nonionic surfactant is described below.

Generally, the ethylene oxide addition type nonionic surfactant is inconvenient for stabilization of ink ejection because of its relatively high viscosity in consideration of ejection stabilization. Therefore, an additional water-soluble organic solvent has been studied to improve the ink ejection without impairing the effects of the present invention. Consequently, thiodiglycol has been found to be satisfactory. The failure of ink ejection is caused generally by rise of viscosity resulting from vaporization of water at the nozzle. The use of thiodiglycol is considered to reduce the rise of the viscosity more than other solvents, thereby improving the ejection property. However, single use of thiodiglycol is not sufficiently effective yet for ejection stabilization. After comprehensive study, it has been found that the combined use of thiodiglycol and urea or a derivative of urea improves greatly the ink ejection property. Presumably, the interaction between the thiodiglycol and urea or a urea derivative suppresses the rise of the viscosity, specifically, and the dissolution of a dye is improved. The thiodiglycol and a urea derivative-thiourea derivative are used respectively in an amount of from 1 to 30% by weight.

The amount of water used in the present first invention is preferably in the range of from 50 to 85%, more preferably from 55 to 75% by weight. If the amount of water is less than 50%, the viscosity of the ink is relatively high, and the ejection stability tends to be relatively lower, even when thiodiglycol or urea or a derivative thereof is used concurrently. If the amount of water is more than 85%, the ethylene oxide portion, which is the hydrophilic portion of the ethylene oxide addition type nonionic surfactant, is relatively free, resulting in less orientation thereof and less uniformity.

The water-soluble organic solvents constituting the ink of the present first invention include polyalkylene glycols such as polyethylene glycol, and polypropylene glycol; alkylene glycols having 2 to 6 carbon atoms such as ethylene glycol, propylene glycol, butylene glycol, triethylene glycol, hexylene glycol, and diethylene glycol; glycerine; 1,2,6-hexanetriol; lower alkyl ethers of polyhydric alcohols such as ethylene glycol methyl ether, diethylene glycol methyl (or ethyl) ether, and triethylene glycol monomethyl (or ethyl) ether; alcohols such as methyl alcohol, ethyl alcohol, n-propyl alcohol, isopropyl alcohol, n-butyl alcohol, sec-butyl alcohol, t-butyl alcohol, isobutyl alcohol, benzyl alcohol, and cyclohexanol; amides such as dimethylformamide, and dimethylacetamide; ketones and ketone alcohols such as acetone, and diacetone alcohol; ethers such as tetrahydrofuran, and dioxane; and nitrogen-containing heterocyclic ketones such as N-methyl-2-pyrrolidone, 2-pyrrolidone, 1,3-dimethyl-2-imidazolidinone.

The water-soluble organic solvent may be incorporated in such an amount that ink-bleeding is not caused, and the ejection property is not impaired. Among the above solvents, preferred are ethylene glycol, triethylene glycol, hexylene glycol, diethylene glycol, glycerin, ethyl alcohol, isopropyl alcohol, cyclohexanol, and so forth. The solvent preferably is contained in an amount of from 1 to 15% by weight based on the total weight of the ink.

The dyes employed in the present invention include direct dyes, acid dyes, reactive dyes, disperse dyes, vat dyes, and the like. The content of the dye is decided depending on the kinds of the liquid medium components and the required properties of the ink, and is generally in the range of from 0.5 to 15%, preferably from 1 to 7% by wight based on the total weight of the ink.

The main constituents of the ink of the present first invention are described above. Other additives may be incorporated provided that the objects of the invention are achievable. The additive includes viscosity-adjusting agents such as polyvinyl alcohol, celluloses, and water-soluble resins; pH-controlling agents such as diethanolamine, triethanolamine, and buffer solutions; fungicides; and so forth. To the ink of an electrically chargeable type used for ink-jet recording in which the ink droplets are charged, a resistivity-adjusting agent is added, such as lithium chloride, ammonium chloride, and sodium chloride.

The second invention will be described in detail.

Generally, inks which contain a compound having one triple bond in the molecule give uniform color. However, the ink of the present second invention provides much more excellent uniformity of color than the above ink containing a compound having one triple bond.

Presumably, the compound which is represented by General Formula [5] having two or more triple bonds and contained in the ink of the present second invention has high electron density in the molecule and has a rigid hydrophobic portion (triple bond-containing portion), causing little a free change in structure in comparison with the compound having one triple bond, whereby the compound of General Formula [5] orients regularly to the surface of the ink, and interacts effectively with the recording medium at the interface to exhibit high wettability.

The ink of the present second invention contains the compound of General Formula [5] below in an amount of preferably from 0.001 to 20%, more preferably from 0.001 to 5% by weight based on the total weight of the ink, and the number of m+n in the formula is in the range of from 0 to 50.

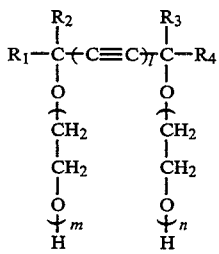

[5]

Specific examples of the compound of General Formula [5] are shown below without limiting the compound thereto in any way.

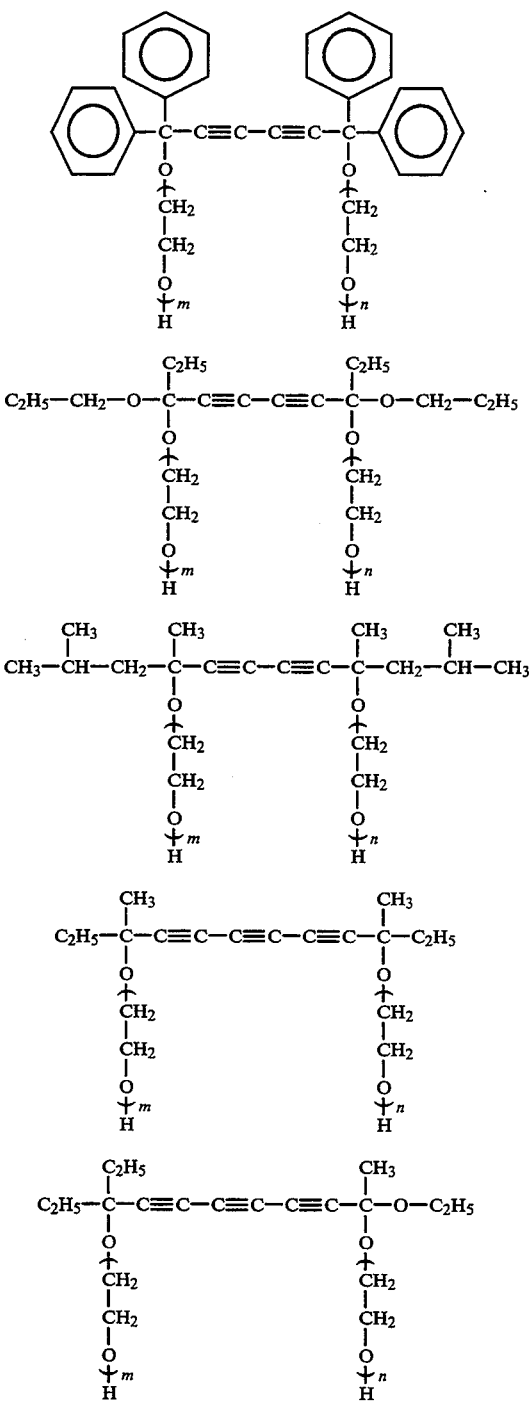

The liquid medium constituting the ink of the present second invention may be a plain water-soluble organic solvent. The water-soluble solvents include polyalkylene glycols such as polyethylene glycol, and polypropylene glycol; alkylene glycols having 2 to 6 carbon atoms such as ethylene glycol, propylene glycol, butylene glycol, triethylene glycol, hexylene glycol, diethylene glycol, and thiodiglycol; glycerine; 1,2,6-hexanetriol; lower alkyl ether of polyhydric alcohols such as ethylene glycol methyl ether, diethylene glycol methyl (or ethyl) ether, and triethylene glycol monomethyl (or ethyl) ether; alcohols such as methyl alcohol, ethyl alcohol, n-propyl alcohol, isopropyl alcohol, n-butyl alcohol, sec-butyl alcohol, t-butyl alcohol, isobutyl alcohol, benzyl alcohol, and cyclohexanol; amides such as dimethylformamide, and dimethylacetamide; ketones and ketone alcohols such as acetone, and diacetone alcohol; ethers such as tetrahydrofuran, and dioxane; and nitrogen-containing heterocyclic ketones such as N-methyl-2-pyrrolidone, 2-pyrrolidone, 1,3-dimethyl-2-imidazolidinone.

Among the above water-soluble solvents, preferred are ethylene glycol, triethylene glycol, hexylene glycol, diethylene glycol, glycerine, thiodiglycol, ethyl alcohol, isopropyl alcohol, cyclohexanol, and so forth. The solvent is preferably contained at a content of from 1 to 35% based on the total weight of the ink.

The dyes employed in the present invention include direct dyes, acid dyes, basic dyes, reactive dyes, disperse dyes, vat dyes, and the like. The content of the dye is decided depending on the kinds of the liquid medium components and the required properties of the ink, and is generally in the range of from 0.5 to 15%, preferably from 1 to 7% by weight based on the total weight of the ink.

The main constituents of the ink of the present second invention are described above. Other additives may be added provided that the objects of the invention are achievable. The additives include clogging preventing agents such as urea and its derivatives; viscosity-adjusting agents such as polyvinyl alcohol, celluloses, and water-soluble resins; pH-controlling agents such as diethanolamine, triethanolamine, and buffer solutions; fungicides; surfactants, and so forth. To the ink of an electrically chargeable type used for ink-jet recording in which the ink droplets are charged, an resistivity-adjusting agent is preferably incorporated such as lithium chloride, ammonium chloride, and sodium chloride.

The inks of the first invention and the second invention are suitable for ink-jet recording in which the ink droplets are ejected by action of thermal energy. However, the inks are naturally useful also for other types of ink-jet recording and for general writing implements.

The recording apparatus suitable for recording with the ink of the present first invention and the present second invention includes those in which thermal energy is given to the ink in a chamber in a recording head in correspondence with recording signals, and thereby ink droplets are formed.

The third invention will be described below in detail.

The inventors of the present invention have noticed the necessary conditions shown below for forming color images in high quality on plain paper.

When different color inks are dotted in a pattern as shown in FIG. 1, the different color inks are less liable to be mixed at the boundaries of the dotted colors, even if the adjacent color is dotted subsequently in a short time. In this case, however, disadvantages may be caused such that the central portion surrounded by dots becomes blank, which may cause decrease of color density, and a slight shift of the ejected ink droplet from the aimed impact point may increase the area of the blank portion.

Figure 2:
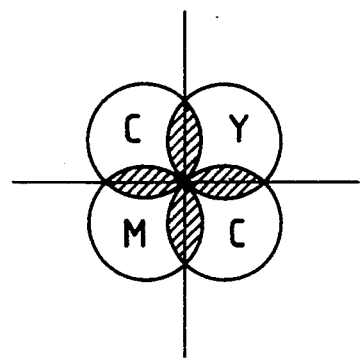
FIG. 2 shows another example of the pattern of dotting of different color inks.

On the contrary, if the ink is dotted as shown in FIG. 2 by satisfying the Equation [II] below, the above disadvantage is significantly reduced, and excellent images are obtained:

$$B \geq \sqrt{2} \times 10^3 \times 1/D \qquad [\text{II}]$$

where B is a dot diameter (μm) formed on plain paper, and D is a recording density (dots/mm). In this method of dotting, however, different color inks are necessarily mixed as shown by the shadowed portions in FIG. 2, and thereby mixing of the different color inks is liable to occur.

In FIGS. 1 and 2, C, M and Y means a droplet of cyan ink, magenta ink and yellow ink, respectively.

The inventors have investigated the method of preventing the mixing of different color inks at the color boundaries with the high quality of image being maintained regarding the case where the inks are dotted according to Equation [II]. As the result, it has been found that the above problem is solved by adjusting the feathering rate (A) shown by Equation [I] below on plain paper to be in the range of from 2.5 to 3.5.

$$A = B/C \qquad [\text{I}]$$

where B is a dot diameter (μm) formed on plain paper, and C is a diameter (μm) of the ejected ink droplet. At the feathering rate of less than 2.5, the ink droplet attached on the paper surface spreads less and the ink layer does not become thin, thereby different colors of inks mixed at the boundaries of colors when inks are dotted under the conditions shown in FIG. 2. On the contrary, at the feathering rate of more than 3.5, the ink droplet spreads excessively and the edge of the dot becomes unclear, thus providing images of low quality.

In order to control the feathering ratio in the range of from 2.5 to 3.5, a nonionic surfactant is incorporated into the ink in an amount of from 1 to 20%, more preferably from 3 to 10% by weight. With the amount of the nonionic surfactant of less than 1% by weight, the feathering ratio becomes less than 2.5, thus causing color ink mixing at the color border, while with the amount of the nonionic surfactant of more than 20% by weight, the feathering rate becomes more than 3.5, thus the image quality is liable to become low.

Simple use of surfactant in a large amount gives rise to disadvantages of lowering of color density and image quality caused by excessive penetration of ink droplets toward the back face of the paper sheet, and of nonuniformity of color density in a solid print portion caused by nonuniform dyeing of the fiber layer at the paper surface. The inventors of the present invention have found that color image recording with high quality is practicable when a nonionic surfactant is used as the surfactant and when printing is carried out using the ink containing it in an amount of from 1 to 20% by weight with controlling the amount of ink ejection in the range of from 10 to 70 pl, preferably from 20 to 50 pl per one nozzle for one pulse. The present third invention has been accomplished on the basis of the above two findings.

The nonionic surfactant does not have selective affinity to a fiber layer on the surface of paper, whereby uniform dyeing is achievable and nonuniformity of color density is avoided. The ink for the color recording method of the present invention contains a surfactant in a large amount. Therefore, if the ink droplets are ejected in an amount of more than 70 pl per one nozzle for one pulse, the amount of the ink exceeds the absorbable and fixable limit of the fiber layer on the paper surface, causing penetration of ink into a pore layer under the fiber layer owing to the penetrating power of the surfactant, thus resulting in deterioration of image quality owing to lowered color density and irregular feathering. Accordingly the amount of the ink ejection has to be controlled to be in the range of from 10 to 70 pl per pulse.

The nonionic surfactants employed in the present third invention include polyoxyethylene alkyl ethers, polyoxyethylene phenyl ethers, polyoxyethylene-polyoxypropylene glycols, polyoxyethylene-polyoxypropylene alkyl ethers, polyethylene oxide adducts of acetylene glycol, etc. Of these, preferred are nonylphenyl ether-ethylene oxide adducts, ethylene oxide-propylene oxide copolymer (EO-PO adducts), acetylene glycol-polyethylene oxide adducts; particularly preferred are acetylene glycol-polyethylene oxide adducts (acetylene glycol-EO adducts) represented by the structural formula below.

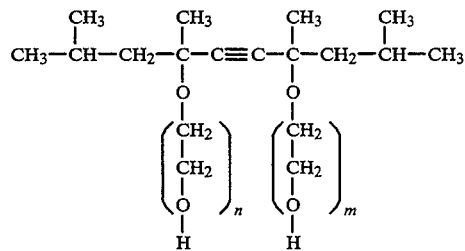

where m+n=10.

The water-soluble organic solvents employed in addition to the nonionic surfactant in the present third invention include amides such as dimethylformamide, and dimethylacetamide; ketones such as acetone; ethers such as tetrahydrofuran, and dioxane; polyalkylene glycols such as polyethylene glycol, and polypropylene glycol; alkylene glycols having 2 to 6 carbon atoms such as ethylene glycol, propylene glycol, butylene glycol, triethylene glycol, thiodiglycol, hexylene glycol, and diethylene glycol; glycerin; 1,2,6-hexanetriol; lower alkyl ether of polyhydric alcohols such as ethylene glycol methyl (or ethyl) ether, diethylene glycol methyl (or ethyl) ether, and triethylene glycol monomethyl (or ethyl) ether; N-methyl-2-pyrrolidone, 1,3-dimethyl-2-imidazolidinone, triethanolamine, sulfolane, dimethylsulfoxide, and so forth.

The clogging-preventing agents include urea and derivatives of urea, sulfonamides, and the like.

The dyes employed in the present invention include direct dyes, acid dyes, reactive dyes, disperse dyes, vat dyes, and the like. The content of the dye is decided depending on the kinds of the liquid medium components and the required properties of the ink, and is generally in the range of from 0.5 to 15%, preferably from 1 to 7% by weight based on the total weight of the ink.

The main constituents of the ink of the present third invention are described above. Other additives may be added provided that the objects of the invention are achievable. The additives include viscosity adjusting agents such as polyvinyl alcohol, celluloses, and water-soluble resins; pH-controlling agents such as diethanolamine, triethanolamine, and buffer solutions; fungicides; and so forth. To formulate the ink of an electrically chargeable type used for ink-jet recording in which the ink droplets are charged, an resistivity-adjusting agent is preferably added such as lithium chloride, ammonium chloride, and sodium chloride.

The recording method of the present third invention is particularly suitable for ink-jet recording in which ink droplets are ejected by the action of thermal energy, but it is also applicable to other ink-jet recording methods.

Figure 3:
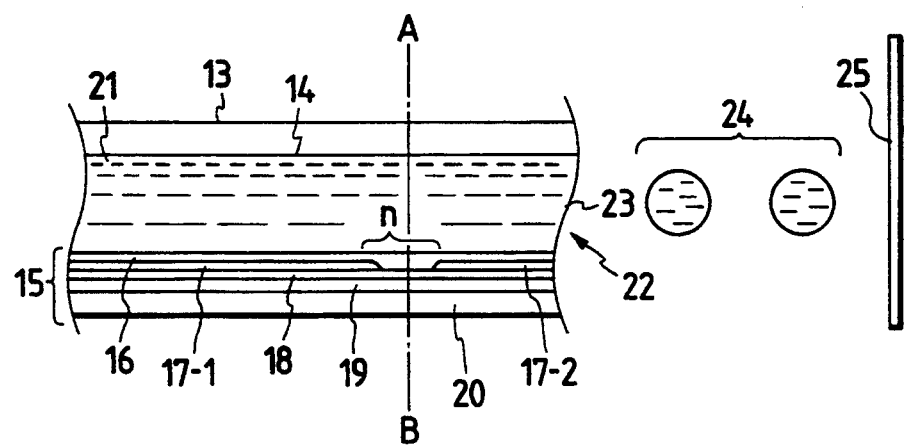
FIG. 3 is a longitudinal cross-sectional view of a head portion of an ink-jet recording apparatus of the present invention.
Figure 4:
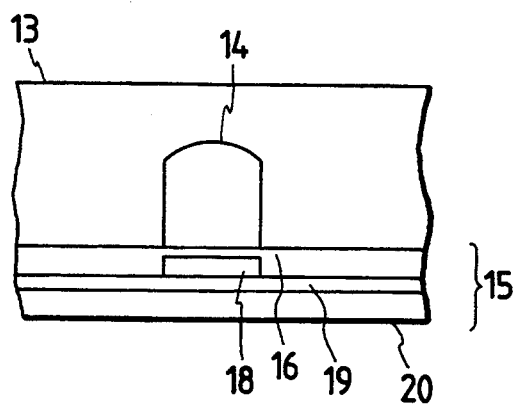
FIG. 4 is a transverse cross-sectional view of a head portion of an ink-jet recording apparatus of the present invention.
Figure 5:
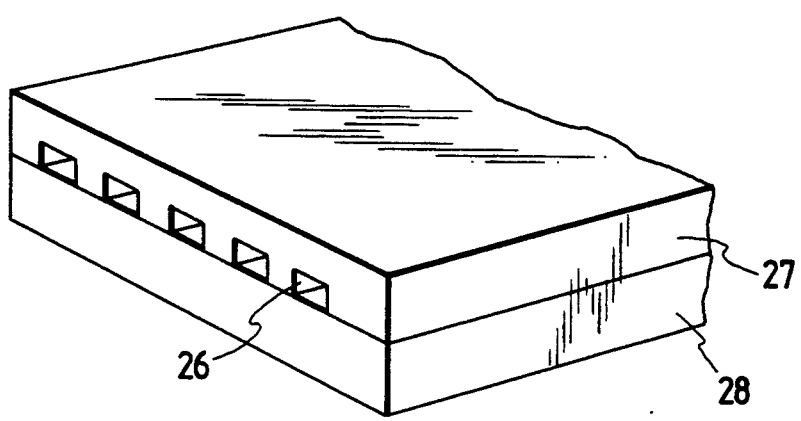
FIG. 5 is a perspective view of a head portion of an ink-jet recording apparatus of the present invention.

A recording apparatus is described below, which produces ink droplets by thermal energy and is suitable for practicing the recording of the present first invention, the present second invention, and the present third invention. The present invention is suitable for the recording system in which recording signal is applied to a recording ink in a recording head and ink droplets are ejected by the action of the generated thermal energy. The construction of the recording head, which is the main portion of the apparatus, is shown in FIGS. 3, 4, and 5.

A head 13 is constructed by bonding a plate of glass, ceramics, or plastics having an ink flow path to a heat-generating head 15. (The head is shown in the drawing, but the invention is not limited to this.) The heat-generating head 15 is constituted of a protection layer 16 formed of silicon oxide or the like, aluminum electrodes 17-1 and 17-2, a heat-generating resistance layer 18 formed of nichrome or the like, a heat accumulation layer 19, and a substrate plate 20 made of aluminum or the like having a high heat-radiating property.

Ink 21 reaches the ejection orifice 22, forming a meniscus 23 by action of pressure P not shown in the drawing.

On application of an electric signal to the electrodes 17-1 and 17-2, the region designated by a symbol "n" on the heat-generating head 15 generates abruptly heat to form a bubble in the portion of the ink 21 contacting therewith. The pressure generated by the bubble pushes out the meniscus 23 and ejects the ink 21 from the orifice 22 in a form of ink droplets 24, and the ink droplets are ejected to a recording medium 25. FIG. 5 shows a rough sketch of a multiple recording head constructed by juxtaposing a multiplicity of heads shown in FIG. 3. The recording head is prepared by bonding a glass plate 27 having a plurality of flow paths to a heat-generating head 28 similar to the one shown in FIG. 3.

Incidentally, FIG. 3 is a cross-sectional view of the head 13 along an ink flow path, and FIG. 4 is a cross-sectional view of the head at the line A-B in FIG. 3.

Figure 6:
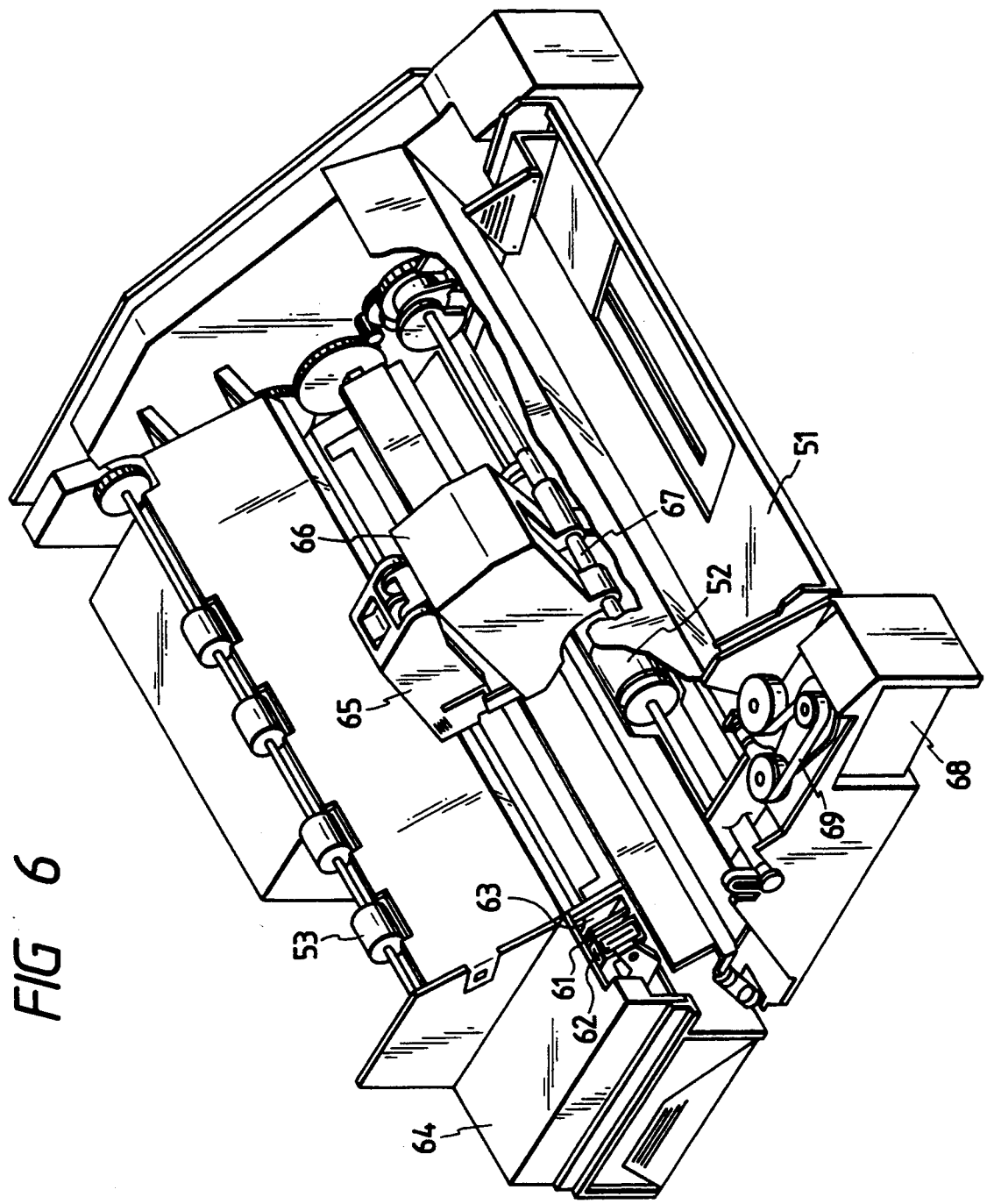
FIG. 6 is a perspective view of an ink-jet recording apparatus of the present invention.

FIG. 6 illustrates an example of the ink-jet recording apparatus having such a head mounted therein.

In FIG. 6, a blade 61 as a wiping member is held at one end by a blade-holding member, forming a fixed end in a shape of a cantilever. The blade 61 is placed at a position adjacent to the recording region of the recording head, and is constituted such that it moves in the direction perpendicular to the moving direction of the recording head to come into contact with the ejection nozzle face to cap the nozzles. An ink absorption member 63 is provided at a position adjacent to the blade 61, and is held so as to protrude into the moving path of the recording head in a manner similar to that of the blade 61. The aforementioned blade 61, the cap 62, and the absorption member 63 constitute an ejection-recovery section 64. The blade 61 and the absorption member 63 remove water, dust, and the like from the ink ejecting nozzle face.

A recording head 65 has an ejection energy-generating means for ejection, and conducts recording by ejecting ink onto a recording medium opposing to the ejection nozzle face. A carriage 66 is provided for supporting and moving the recording head 65. The carriage 66 is engaged slideably with a guide rod 67. A portion of the carriage 66 is connected (not shown in the drawing) to a belt 69 driven by a motor 68, so that the carriage 66 is movable along the guide rod 67 to the recording region of the recording head 65 and the adjacent region thereto.

A paper delivery portion 51 for delivery of a recording medium and a paper delivery roller 52 driven by a motor (not shown in the drawing) delivers the recording medium to the position opposing to the ejecting nozzle face of the recording head, and the recording medium is discharged with the progress of the recording to a paper discharge portion provided with paper-discharging rollers 53.

In the above constitution, when the recording head 65 returns to a home position at the completion of the recording or other timing, the cap 62 of the ejection-recovery portion 64 is positioned out of the moving path of the recording head 65, and the blade 61 is made to protrude into the moving path. Therefore, the ejecting nozzle face of the recording head 65 is wiped therewith. The cap 62 moves to protrude toward the moving path of the recording head when the cap 62 comes into contact with the ejecting nozzle face of the recording head for capping.

At the time when the recording head 65 moves from the home position to the record-starting position, the cap 62 and the blade 61 are at the same position as in the above-mentioned wiping time, so that the ejection nozzle face of the recording head is wiped also in this movement.

The recording head moves to the home position not only at the end of the recording and at the time of ejection recovery, but also at a predetermined interval during movement for recording in the recording region. By such movement, the wiping is conducted.

Figure 7:
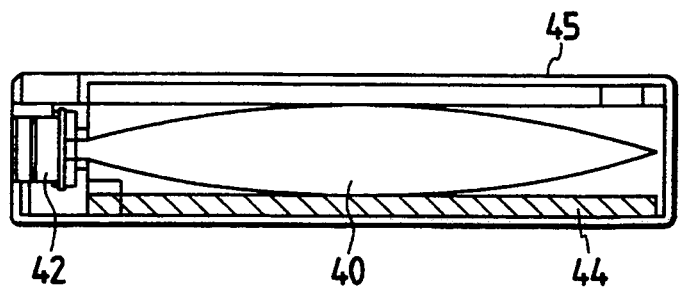
FIG. 7 is a longitudinal sectional view of an ink cartridge of the present invention.

FIG. 7 illustrates an example of the ink cartridge that contains ink to be supplied through an ink supplying member such as a tube. The ink container portion 40, for example an ink bag, contains an ink to be supplied, and has a rubber plug 42 at the tip. By inserting a needle (not shown in the drawing) into the plug 42, the ink in the ink bag 40 becomes suppliable. An ink absorption member 44 absorbs waste ink.

The ink container portion has preferably a liquid-contacting surface made of polyolefin, particularly preferably made of polyethylene.

The ink-jet recording apparatus used in the present invention is not limited to the above-mentioned one which has separately a head and an ink cartridge. Integration thereof as shown in FIG. 8 may suitably be used.

Figure 8:
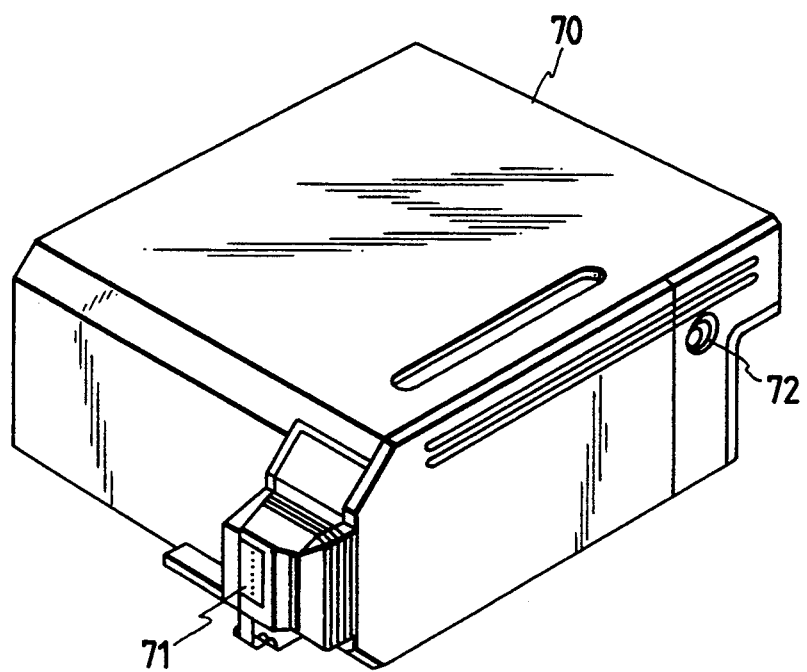
FIG. 8 is a perspective view of a recording unit of the present invention.

In FIG. 8, a recording unit 70 houses an ink container portion such as an ink absorption member, and the ink in the ink absorption member is ejected from a head 71 having a plurality of orifices. The ink absorption member may be made of a material such as polyurethane. An air-communication opening 72 is provided to communicate the interior of the cartridge with the open air. The recording unit 70 may be used in place of the recording head shown in FIG. 6, and is readily mountable to and demountable from the carriage 66.

An ink-jet recording apparatus which ejects ink droplets by action of thermal energy to the ink is exemplified above. The present invention, however, is applicable also to other ink-jet recording apparatuses such as the one of a piezo type which employs a piezoelectric element.

Figure 9:
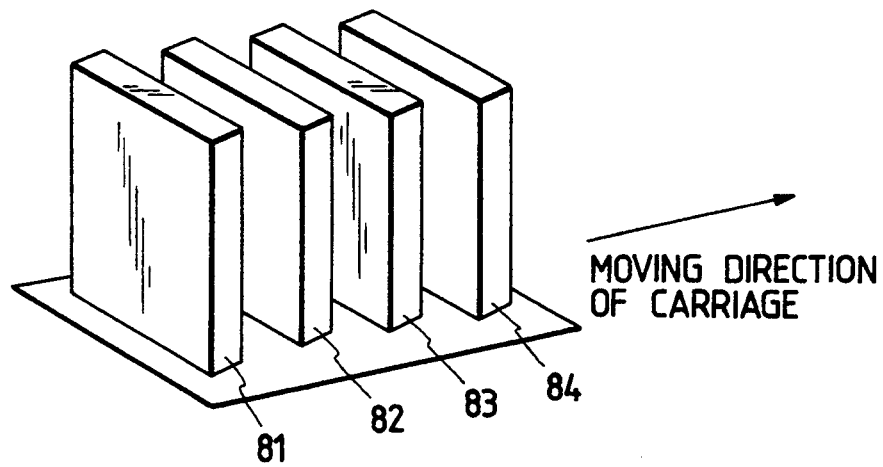
FIG. 9 is a perspective view of a recording portion in which a plurality of recording heads are arranged and which was used in an example of the present invention.
Figure 10:
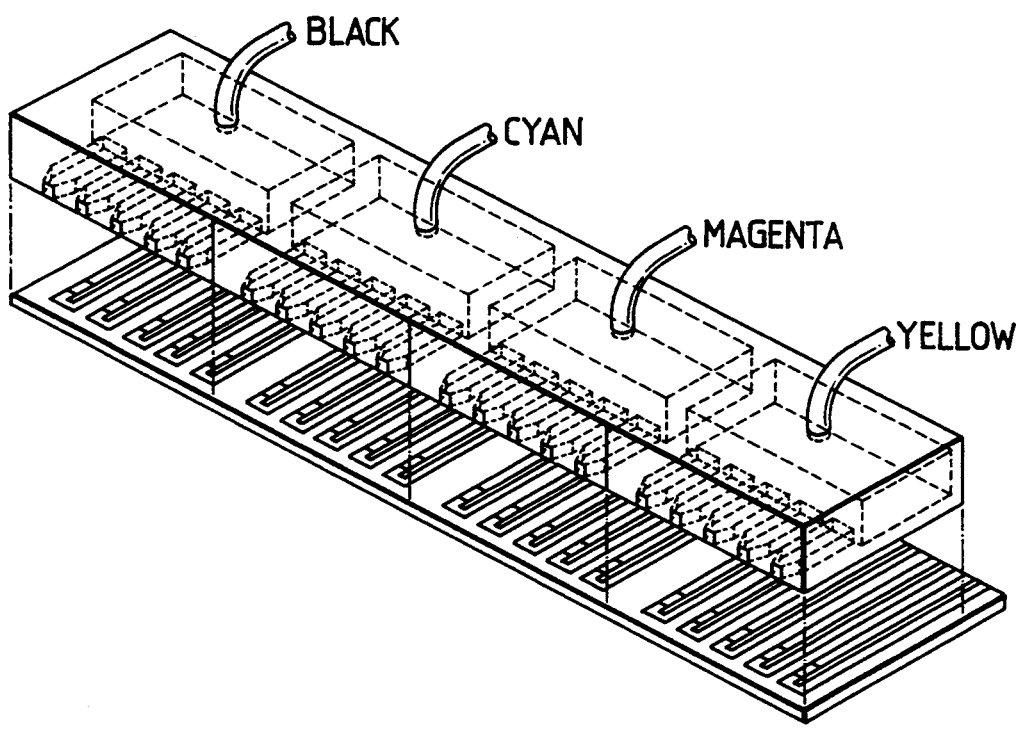
FIG. 10 is a perspective view of another recording head used in the present invention.

For practicing the recording according to the present invention, a recording apparatus, for example, is used which has four (in number) of recording heads shown in FIG. 5 juxtaposed on a carriage. FIG. 9 shows an example of the apparatus. Recording heads 81, 82, 83, and 84 are recording heads ejecting respectively recording inks of yellow, magenta, cyan, and black. The heads are mounted on the aforementioned recording apparatus, and eject respective color inks in accordance with recording signals. The apparatus in FIG. 9 employs four recording heads, but the present invention is not limited thereto. One recording head may be constructed to eject all of the yellow, magenta, cyan, and black inks as shown in FIG. 10.

The present invention is described in more detail by reference to the Examples and Comparative Examples. In the description, the terms "parts" and "%" are based on weight unless otherwise mentioned. Hereinafter, the ethylene oxide adduct is simply referred to as "EO adduct".

The dyes and liquid medium in an amount (parts) shown below are employed in the Example and Comparative Example to provide each 100 parts of inks, respectively.

Fluoropore Filter (trade name, made by Sumitomo Electric Industries, Ltd.) having a pore diameter of 0.22 μm to prepare the ink of the present invention. The respective inks were introduced into a color ink-jet printer BJC-820J (trade name, made by Canon K.K.) which conducts recording by forming ink droplets by applying thermal energy to the inks in the recording heads, and recording was conducted on commercial paper sheets for copying (Canon NP Dry SK), and bond paper sheets (Plover Bond Paper PB).

Evaluation was made as described below. The results are shown in Table 1.

(1) Bleeding:

Color samples were prepared by printing such that different colors are adjacent to each other, and the occurrence of bleeding was evaluated by the standard below. The evaluation was made for seven colors: black, yellow, cyan, and magenta; and red, green, and blue formed by dotting in superposition of two colors taken from the colors of yellow, cyan, and magenta.

o : No bleeding is observed at every boundary.

Δ : Bleeding is remarkable at the boundaries of red, green, and blue where a larger amount of ink is applied.

x : Bleeding is remarkable at nearly all the boundaries.

(2) Color uniformity:

Uniformity at solid color print portions are examined visually.

EXAMPLE 1

| | (Dyes) | |
|---|---|---|
| Black: | C.I. Food Black 2 | 2 parts |
| | Dye A of Formula below | 1.2 parts |
| | Dye B of Formula below | 0.8 part |
| Yellow: | C.I. Direct Yellow 86 | 2.5 parts |
| Cyan: | C.I. Direct Blue 199 | 3.5 parts |
| Magenta: | Dye C of Formula below | 3.5 parts |
| | (Liquid medium) | |
| | Thiodiglycol | 7.5 parts |
| | Urea | 7.5 parts |
| | Glycerin | 7.5 parts |
| | Higher alcohol-EO adduct (n = 15)* | 1 part |
| | Pure water | balance |

*(Higher alcohol-EO adduct: BO-15TX (made by Nikko Chemicals K.K.) is used.

Dye A

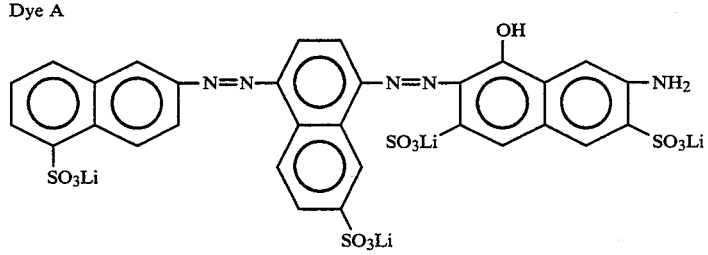

Dye B

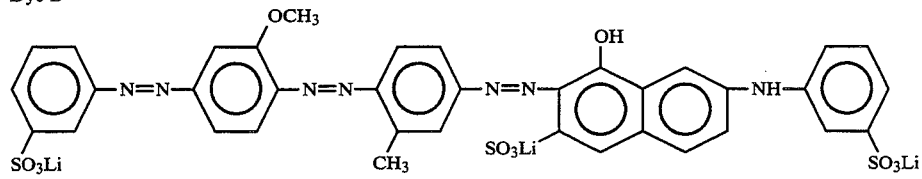

Dye C

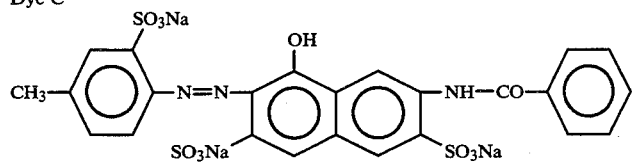

Each of the four color compositions was stirred sufficiently, and was filtered under pressure through a ○ : Solid color print is completely uniform without irregularity.

Δ : Nonuniformity is remarkable at the portion where fiber density is high.

x : Color irregularity is much more remarkable.

(3) Occurrence of feathering:

Three hundred dots are printed continuously on a commercial paper sheet for copying and a commercial bond paper sheet such that the dots are not brought into contact with each other. The dotted ink are dried in the air for 24 hours at room temperature. Irregular shape and irregular feathering of dots are counted under a microscope. The evaluation is made by the percentage of the counted dot number according to the standard below:

⊚ : not more than 10%
○ : 11% to 30%
Δ : 31% to 50%
x : not less than 51%

(4) Ejection property:

The ink to be tested is filled in the printer, and alphabet and numeral letters are printed continuously for 10 minutes with the printer. Thereafter, the printer is left standing without capping the nozzles. After 10 minutes of intermission of the printing, the printing is started again. The ejection property is evaluated from scratches and unsharp edges in printed letters after restarting the printing.

○ : No scratch and no unsharp edge is observed from the first letter.
Δ : A part of the first letter is scratched or unsharp.
x : The first letter cannot be printed.

(5) Storage stability:

The ink is placed in an amount of 100 ml in a heat-resistant glass bottle, stoppered tightly, and stored in a thermostatic chamber at 60° C. After 2 months of storage, the ink is used for printing, and evaluated.

○ : No abnormality is observed.
x : Failure of discharge, or irregularity or discoloration of printed letters is observed.

(6) Anti-Clogging (crusting recovery):

The ink to be tested is filled in the printer, and alphabet and numeral letters are printed continuously for 10 minutes with the printer. Thereafter, the printer is left standing without capping of the nozzles. After one month of intermission of the printing, ejection recovery operation was conducted. The evaluation was made by counting the required number of times of the ejection recovery operations for carrying out normal printing.

○ : Printing is normal after 1 to 5 times of ejection recovery operation.
Δ : Printing is normal after 6 to 10 times of ejection recovery operation.
x : Printing is normal after 11 or more times of ejection recovery operation.

EXAMPLES 2 TO 5

In the respective Examples, the kind and the amount of the dyes used were as below:

| (Dyes for Examples 2 to 4) | | |
|---|---|---|
| Black: | C.I. Food Black 2 | 2 parts |
| | Dye A | 1.2 parts |
| | Dye B | 0.8 part |
| Yellow: | C.I. Direct Yellow 86 | 2.5 parts |
| Cyan: | C.I. Direct Blue 199 | 3.5 parts |
| Magenta: | Dye C | 3.5 parts |

| (Dyes for Example 5) | | |
|---|---|---|
| Black: | C.I. Food Black 2 | 2 parts |
| | Dye A | 1.2 parts |
| | Dye B | 0.8 part |
| Yellow: | C.I. Direct Yellow 86 | 2.5 parts |
| Cyan: | C.I. Acid Blue 9 | 3.0 parts |
| Magenta: | Dye C | 3.5 parts |

The liquid mediums used in the respective Examples were as below:

| (Liquid medium for Example 2) | |
|---|---|
| Thiodiglycol | 7.5 parts |
| Urea | 7.5 parts |
| Glycerine | 7.5 parts |
| Nonylphenyl ether-EO adduct (n = 9 to 10) | 5 part |
| Pure water | balance |
| (Liquid medium for Example 3) | |
| Thiodiglycol | 7.5 parts |
| Thiourea | 7.5 parts |
| Glycerine | 7.5 parts |
| Ethylene oxide-propylene oxide copolymer (n = 10, L = 7) | 15 parts |
| Pure water | balance |
| (Liquid medium for Example 4) | |
| Thiodiglycol | 7.5 parts |
| Urea | 7.5 parts |
| Glycerine | 7.5 parts |
| Acetylene glycol-EO adduct (n + m = 10) | 5 parts |
| Pure water | balance |
| (Liquid medium for Example 5) | |
| Thiodiglycol | 7.5 parts |
| Urea | 7.5 parts |
| Glycerine | 7.5 parts |
| Acetylene glycol-EO adduct (n + m = 4) | 1 parts |
| Pure water | balance |

In the above, as acetylene glycol-EO adduct, Acetylenol (made by Kawaken Fine Chemical K.K.), as the nonylphenyl ether-EO adduct, Emulgen 909 (made by Kao Corporation), and as the ethylene oxide-propylene oxide copolymer, Karpole MH-50 (made by Asahi Denka Kogyo K.K.) are used, respectively.

The respective inks were prepared with the dye and the liquid medium shown above in the same manner as in Example 1. Printing properties, ejection properties, and the storage stability of the inks were evaluated in the same manner as in Example 1. The results are shown in Table 1.

COMPARATIVE EXAMPLES 1 TO 5

In the respective Comparative Examples, the kind and the amount of the dyes were are as below:

| (Dyes for Comparative Examples 1 to 5) | | |
|---|---|---|
| Black: | C.I. Food Black 2 | 2 parts |
| | Dye A | 1.2 parts |
| | Dye B | 0.8 part |
| Yellow: | C.I. Direct Yellow 86 | 2.5 parts |
| Cyan: | C.I. Direct Blue 199 | 3.5 parts |
| Magenta: | Dye C | 3.5 parts |

The liquid mediums used in the respective Comparative Examples were as below:

| (Liquid medium for Comparative Example 1) | |
|---|---|
| Thiodiglycol | 7.5 parts |

-continued

| | |
|---|---|
| Urea | 7.5 parts |
| Glycerine | 7.5 parts |
| Pure water | balance |
| (Liquid medium for Comparative Example 2) | |
| Thiodiglycol | 15 parts |
| Glycerine | 7.5 parts |
| Acetylene glycol-EO adduct (n + m = 10) | 5 parts |
| Pure water | balance |
| (Liquid medium for Comparative Example 3) | |
| Urea | 10 parts |
| Glycerine | 12.5 parts |
| Acetylene glycol-EO adduct (n + m = 10) | 5 parts |
| Pure water | balance |
| (Liquid medium for Comparative Example 4) | |
| Thiodiglycol | 7.5 parts |
| Urea | 7.5 parts |
| Glycerine | 7.5 parts |
| Anionic surfactant (Neopelex 25, made by Kao Corporation) | 7 parts |
| Pure water | balance |
| (Liquid medium for Comparative Example 5) | |
| Thiodiglycol | 7.5 parts |
| Urea | 7.5 parts |
| Glycerine | 7.5 parts |
| Cationic surfactant (Cation DDC-50, made by Sanyo Chemical Industries, Ltd.) | 5 parts |
| Pure water | balance |

The respective inks were prepared with the dye and the liquid medium shown above in the same manner as in Example 1. Printing properties, ejection properties, and the storage stability of the inks were evaluated in the same manner as in Example 1. The results are shown in Table 1.

TABLE 1

| Evaluation item | (1) SK | (1) PB | (2) SK | (2) PB | (3) SK | (3) PB | (4) | (5) | (6) |
|---|---|---|---|---|---|---|---|---|---|
| Examples | | | | | | | | | |
| 1 | ○ | ○ | ○ | ○ | ○ | ○ | ○ | ○ | ○ |
| 2 | ○ | ○ | ○ | ○ | ○ | ○ | ○ | ○ | ○ |
| 3 | ○ | ○ | ○ | ○ | ○ | ○ | ○ | ○ | ○ |
| 4 | ○ | ○ | ○ | ○ | ⊙ | ⊙ | ○ | ○ | ○ |
| 5 | ○ | ○ | ○ | ○ | ⊙ | ⊙ | ○ | ○ | ○ |
| Comparative examples | | | | | | | | | |
| 1 | x | x | x | x | ⊙ | ⊙ | ○ | ○ | ○ |
| 2 | ○ | ○ | ○ | ○ | ⊙ | ⊙ | Δ | ○ | x |
| 3 | ○ | ○ | ○ | ○ | ○ | ○ | x | ○ | Δ |
| 4 | ○ | ○ | Δ | x | x | x | x | x | Δ |
| 5 | Δ | x | Δ | x | Δ | Δ | x | x | x |

SK: Commercial paper for copying
PB: Plover Bónd paper

EXAMPLES 6 TO 10 AND COMPARATIVE EXAMPLE 6

The dyes of black, cyan, magenta, and yellow, and the amount thereof used in the respective Examples and Comparative Example are as shown below:

| (Dyes) | | |
|---|---|---|
| Black: | C.I. Food Black 2 | 2 parts |
| | Dye A | 1.2 parts |
| | Dye B | 0.8 part |
| Yellow: | C.I. Direct Yellow 86 | 2.5 parts |
| Cyan: | C.I. Acid Blue 9 | 3.5 parts |
| Magenta: | Dye C | 3.5 parts |

EXAMPLE 6

| | |
|---|---|
| Dye (black, yellow, cyan, or magenta) | in an amount as shown above |
| Glycerine | 8 parts |
| Urea | 5 parts |
| Thiodiglycol | 8 parts |
| Compound No. 1 | 1 part |
| Pure water | balance |

The above ink compositions were respectively stirred sufficiently, and filtered through a Fluoropore Filter (pore diameter 0.22 μm, trade name, made by Sumitomo Electric Industries, Ltd.) to prepare inks of this Example.

EXAMPLE 7

| | |
|---|---|
| Dye (black, yellow, cyan, or magenta) | in an amount as shown above |
| Glycerine | 8 parts |
| Urea | 5 parts |
| Thiodiglycol | 8 parts |
| Compound No. 2 | 16 part |
| Pure water | balance |

The above ink compositions were prepared in the same manner as in Example 6 to prepare inks of this Example.

EXAMPLE 8

| | |
|---|---|
| Dye (black, yellow, cyan, or magenta) | in an amount as shown above |
| Glycerine | 8 parts |
| Urea | 5 parts |
| Thiodiglycol | 8 parts |
| Compound No. 3 | 0.5 part |
| Cyclohexanol | 1 part |
| Pure water | balance |

The above ink compositions were prepared in the same manner as in Example 6 to prepare inks of this Example.

EXAMPLE 9

| | |
|---|---|
| Dye (black, yellow, cyan, or magenta) | in an amount as shown above |
| Glycerine | 8 parts |
| Urea | 5 parts |
| Thiodiglycol | 8 parts |
| Compound No. 4 | 10 parts |
| Pure water | balance |

The above ink compositions were prepared in the same manner as in Example 6 to prepare inks of this Example.

EXAMPLE 10

| | |
|---|---|
| Dye (black, yellow, cyan, or magenta) | in an amount as shown above |
| Glycerine | 8 parts |
| Urea | 5 parts |
| Thiodiglycol | 8 parts |
| Compound No. 5 | 5 parts |
| Pure water | balance |

The above ink compositions were prepared in the same manner as in Example 6 to prepare inks of this Example.

COMPARATIVE EXAMPLE 6

| Dye (black, yellow, cyan, or magenta) | in an amount as shown above |
|---|---|
| Glycerine | 5 parts |
| Urea | 5 parts |
| Thiodiglycol | 6 parts |
| Pure water | balance |

The above ink compositions were prepared in the same manner as in Example 6 to prepare inks of this Comparative Example.

<Evaluation>

The obtained inks of Examples 6 to 10 and Comparative Example 6 were used for printing on commercial paper sheets for copying (Canon NP dry SK, and Prober bond paper PB). The recording apparatus employed was similar to the one shown in FIG. 6. A color image was formed by use of four recording heads shown in FIG. 9. The recording heads were the same as the ones used in the ink-jet printer BJC-820J (trade name, made by Canon K.K.). The recording heads were driven under the driving conditions (or current-flowing conditions) of the applied voltage of 28 V, the pulse width of 3.2 μsec, and the drive frequency of 5 kHz.

The inks were evaluated regarding the evaluation items below. The results are shown in Table 2.

(1) Bleeding:
Evaluated in the same manner as in Example 1.
(2) Uniformity of color:
Evaluated in the same manner as in Example 1.
(3) Rate of occurrence of feathering:
Three hundred dots are printed continuously on a commercial paper sheet for copying and a commercial bond paper sheet such that the dots are not brought into contact with each other. The dotted ink is dried in the air for 24 hours at room temperature. Irregular shape and irregular feathering of dots are counted under a microscope. The evaluation is made by the percentage of the counted dot number according to the standard below:
o : not more than 10%
Δ : 10% to 20%
x : not less than 21%
(4) Storage stability:
Evaluated in the same manner as in Example 1.
(5) Anti-Clogging (crusting recovery):
Evaluated in the same manner as in Example 1.

TABLE 2

| Evaluation item | (1) | (2) | (3) | (4) | (5) |
|---|---|---|---|---|---|
| Example 6 | o | o | o | o | o |
| Example 7 | o | o | o | o | o |
| Example 8 | o | o | o | o | o |
| Example 9 | o | o | o | o | o |
| Example 10 | o | o | o | o | o |
| Comparative example 6 | x | x | o | o | o |

EXAMPLES 11 TO 18 AND COMPARATIVE EXAMPLES 7 TO 10

A color ink-jet recording apparatus which has four heads of the same recording density for yellow, magenta, cyan, and black colors and conducts recording by generation of ink droplets upon applying thermal energy to the inks in the recording head was employed. Three kinds of multiple-nozzle On-Demand type heads of recording densities of 300 dpi (11.8 dots/mm), 360 dpi (14.2 dots/mm), and 400 dpi (15.7 dots/mm) were used.

The color inks (yellow, magenta, cyan, and black) for the respective Examples were prepared by stirring sufficiently the composition shown below and filtering the mixture through a Fluoropore Filter (pore diameter of 0.22 μm, trade name, made by Sumitomo Electric Industries, Ltd.) under pressure.

| (Dyes) | |
|---|---|
| Black: C.I. Food Black 2 | 2 parts |
| Dye A | 1.2 parts |
| Dye B | 0.8 part |
| Yellow: C.I. Direct Yellow 86 | 2.5 parts |
| Cyan: C.I. Direct Blue 199 | 3.5 parts |
| Magenta: Dye C | 3.5 parts |
| (Liquid medium) | |
| Thiodiglycol | 7.5 parts |
| Urea | 7.5 parts |
| Glycerine | 7.5 parts |
| Surfactant | (as shown in Table 3) |
| Pure water | balance |

With the recording apparatus having the heads of recording density shown in Table 3 mounted thereon, recording was conducted at the ejection rate shown on commercial paper for copying (Canon NP dry SK, and Xerox 4024), and commercial bond paper (Plover bond paper sheet PB), and the recorded matter was evaluated.

The printed dot diameters and the feathering rates derived from the dot diameter are shown in Table 3. The evaluation results are shown in Table 4.

Recording was carried out under environmental conditions of the temperature of 25±2° C. and the humidity of from 50 to 70% RH, and the printed samples were evaluated after they were left for one day from the time they were printed.

The dot diameter ("B" in Equation [I]) in the present invention was derived by image processing of printed dots by means of a CCD camera to measure the area of the dot and conversion of the area to a diameter of precise circle. The ink droplet diameter ("C" in Equation [I]) was calculated from the equation below:

$$V = (4/3)\pi(C/2)^3 \times 10^{-3}$$

where V is the volume of a droplet (pl) ejected per one pulse.

The evaluation items:
(1) Bleeding,
(2) Uniformity of color, and
(3) rate of feathering were evaluated in the same manner as in Example 1.
(4) Optical density:
The optical density of the printed matter was measured by MacBeth Refractodensitometer RD-915 (made by MacBeth Co.). The average O.D. values of yellow, magenta, cyan, and black were evaluated according to the standard below:
o : not less than 1.0
Δ : 0.9 to 1.0
x : not more than 0.9

TABLE 3

| | Surfactant | | Recording density (dots/mm) | Dot diameter (B) (μm) | Ink-drop diameter (C) (μm) | Amount of ejection (pl) | Ink-running rate (A) |
|---|---|---|---|---|---|---|---|
| | Type | Concentration (parts) | | | | | |
| Example | | | | | | | |
| 11 | Acetylene glycol-EO adduct | 1.5 | 14.2 | 114.4 | 44 | 44.6 | 2.6 |
| 12 | Acetylene glycol-EO adduct | 5 | 14.2 | 123.2 | 44 | 44.6 | 2.8 |
| 13 | Acetylene glycol-EO adduct | 15 | 14.2 | 136.4 | 44 | 44.6 | 3.1 |
| 14 | Acetylene glycol-EO adduct | 15 | 15.7 | 91.8 | 27 | 10 | 3.4 |
| 15 | Acetylene glycol-EO adduct | 10 | 14.2 | 116.5 | 38.5 | 30 | 2.9 |
| 16 | Acetylene glycol-EO adduct | 5 | 11.8 | 131.0 | 48.5 | 60 | 2.7 |
| 17 | EO-PO copolymer | 7 | 15.7 | 97.2 | 36 | 24.4 | 2.7 |
| 18 | Nonylphenyl ether-EO adduct | 5 | 11.8 | 130.5 | 45 | 47.7 | 2.9 |
| Comparative Example | | | | | | | |
| 7 | Acetylene glycol-EO adduct | 0.5 | 14.2 | 101.2 | 44 | 44.6 | 2.3 |
| 8 | Acetylene glycol-EO adduct | 5 | 11.8 | 143.1 | 53 | 78.0 | 2.7 |
| 9 | Acetylene glycol-EO adduct | 2.5 | 14.2 | 162.8 | 44 | 44.6 | 3.7 |
| 10 | Sodium dodecylbenzenesulfonate | 5 | 15.7 | 98.1 | 44 | 44.6 | 2.2 |

TABLE 4

| | Bleeding | Feathering | Optical density | Density irregularity |
|---|---|---|---|---|
| Example | | | | |
| 11 | Δ | o | o | o |
| 12 | o | o | o | o |
| 13 | o | Δ | o | o |
| 14 | o | o | Δ | o |
| 15 | o | o | o | o |
| 16 | o | Δ | o | o |
| 17 | o | o | o | o |
| 18 | o | o | o | o |
| Comparative Example | | | | |
| 7 | x | x | Δ | Δ |
| 8 | o | x | x | o |
| 9 | o | x | x | o |
| 10 | x | x | x | x |

As described above, the present invention gives color images of high quality formed by dots of a precisely circle shape with excellent color density without causing feathering, bleeding, and color nonuniformity even on plain paper.

Furthermore, the present invention enables excellent recording without failure of ejection after intermission of printing with stability and without nozzle clogging.

What is claimed is:

1. An ink for ink-jet recording, comprising a dye, water and the components (a), (b), and (c):
    (a) at least one surfactant selected from the group consisting of higher alcohol-ethylene oxide adducts represented by general Formula (1), alkylphenol-ethylene oxide adducts represented by general Formula (2), ethylene oxide-propylene oxide copolymers represented by general Formula (3), and acetylene glycol-ethylene oxide adducts represented by general Formula (4), at a content of from 0.1 to 20% by weight;

$$R-O-(CH_2CH_2O)_n-H \quad (1)$$

where R is alkyl, and n is an integer;

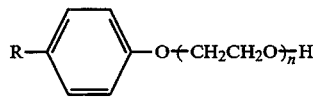
(2)

where R is alkyl, and n is an integer;

$$HO-(CH_2CH_2O)_n-(CHCH_2O)_l-R \quad \text{with } CH_3 \text{ branch} \quad (3)$$

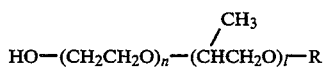

where R is alkyl or hydrogen, and n and l are respectively an integer;

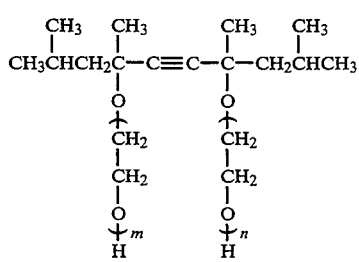
(4)

where m and n are respectively an integer;
    (b) thiodiglycol; and
    (c) urea or a derivative thereof.

2. An ink for ink-jet recording according to claim 1, wherein the ink contains thiodiglycol at a content of from 1 to 30% by weight.

3. An ink for ink-jet recording according to claim 1, wherein the ink contains urea or the derivative thereof at a content of from 1 to 30% by weight.

4. An ink for ink-jet recording according to claim 1, wherein the value of n or n+m in general Formulas [1] to [4] is from 4 to 20.

5. An ink-jet recording method comprising the steps of:
    (i) selecting an ink comprising a dye, water, and the components (a), (b), and (c):
    (a) at least one surfactant selected from the group consisting of higher alcohol-ethylene oxide adducts represented by general Formula (1), alkylphenol-ethylene oxide adducts represented by general Formula (2), ethylene oxide-propylene oxide copolymers represented by general Formula (3), and acetylene glycol-ethylene oxide adducts represented by general Formula (4), at a content of from 0.1 to 20% by weight;

$$R-O-(CH_2CH_2O)_n-H \quad (1)$$

where R is alkyl, and n is an integer;

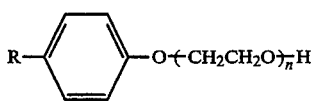  (2)

where R is alkyl, and n is an integer;

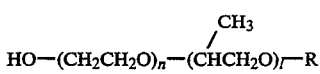  (3)

where R is alkyl or hydrogen, and n and l are respectively an integer;

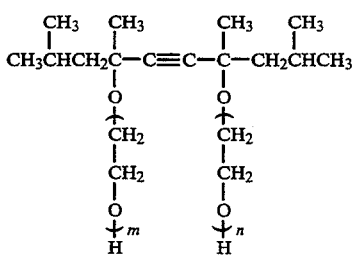  (4)

where m and n are respectively an integer;
(b) thiodiglycol; and
(c) urea or a derivative thereof; and
(ii) conducting recording on a recording medium with ink droplets of said ink.

6. An ink-jet recording method according to claim 5, wherein ink droplets are ejected by action of thermal energy applied to the ink.

7. A color ink-jet recording method comprising the step of conducting recording by ejecting droplets of ink of two or more colors onto adjacent or superposed positions on a recording medium, said ink comprising a dye, water and the components (a), (b), and (c):
(a) at least one surfactant selected from the group consisting of higher alcohol-ethylene oxide adducts represented by general Formula (1), alkylphenol-ethylene oxide adducts represented by general Formula (2), ethylene oxide-propylene oxide copolymers represented by general Formula (3), and acetylene glycol-ethylene oxide adducts represented by general Formula (4), at a content of from 0.1 to 20% by weight;

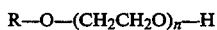  (1)

where R is alkyl, and n is an integer;

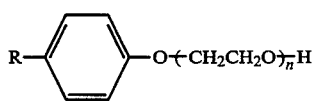  (2)

where R is alkyl, and n is an integer;

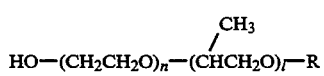  (3)

where R is alkyl or hydrogen, and n and l are respectively an integer;

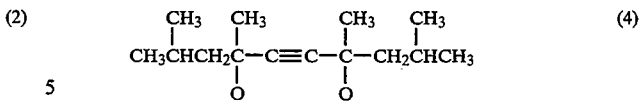  (4)

(b) thiodiglycol; and
(c) urea or a derivative thereof.

8. A color ink-jet recording method according to claim 7, wherein ink droplets are ejected by action of thermal energy applied to the ink.

9. An ink containing at least a dye, a water-soluble organic solvent, and water, said ink further comprising a compound of the formula

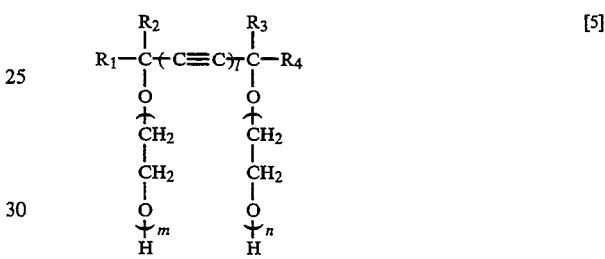  [5]

where $R_1$, $R_2$, $R_3$, and $R_4$ are respectively hydrogen, an alkyl or alkenyl group of 1 to 4 carbon atoms, or a substituted or unsubstituted phenyl group; and m+n is ranging from 0 to 50; and l is a number of 2 or more.

10. An ink according to claim 9, wherein the ink contains the compound represented by general Formula [5] at a content of from 0.001% to 20% by weight.

11. An ink according to claim 9, wherein the water-soluble organic solvent is selected from the group consisting of polyhydric alcohols, monohydric alcohols, and derivatives thereof.

12. An ink-jet recording method comprising the steps of:
(i) selecting an ink comprising a dye, a water-soluble organic solvent, water, and a compound of the formula

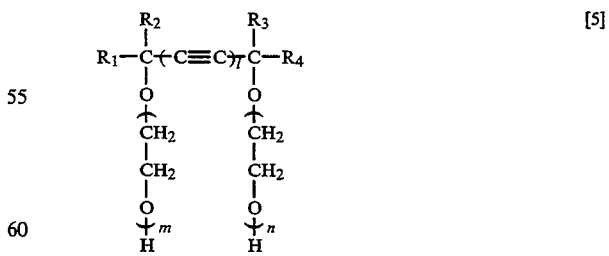  [5]

where $R_1$, $R_2$, $R_3$, and $R_4$ are respectively hydrogen, an alkyl or alkenyl group of 1 to 4 carbon atoms, or a substituted or unsubstituted phenyl group; and m+n is ranging from 0 to 50; and l is a number of 2 or more; and
(ii) conducting recording on a recording medium with ink droplets of said ink.

13. An ink-jet recording method according to claim 12, wherein ink droplets are ejected by action of thermal energy applied to the ink.

14. A color ink-jet recording method comprising the step of conducting recording by ejecting droplets of ink of two or more colors onto adjacent or superposed positions on a recording medium, said ink comprising a dye, a water-soluble organic solvent, water, and the compound of the formula

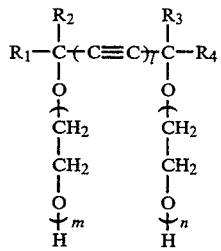
[5]

where $R_1$, $R_2$, $R_3$, and $R_4$ are respectively hydrogen, an alkyl or alkenyl group of 1 to 4 carbon atoms, or a substituted or unsubstituted phenyl group; and m+n is ranging from 0 to 50; and l is a number of 2 or more.

15. A color ink-jet recording method according to claim 14, wherein ink droplets are ejected by action of thermal energy applied to the ink.

16. An ink-jet recording method according to any of claims 5, 7, 12, and 14, wherein the recording medium has fiber exposed on the surface thereof.

17. A recording unit having an ink container portion for holding ink, and a head portion for ejecting the ink as ink droplets, said ink is as defined in claim 1 or 9.

18. A recording unit according to claim 17, wherein the head portion comprises a head which ejects ink droplets by action of thermal energy applied to the ink.

19. An ink cartridge comprising an ink container portion for holding ink, said ink is as defined in claim 1 or claim 9.

20. An ink cartridge according to claim 19, wherein the ink container portion is in a bag-shape structure.

21. An ink cartridge according to claim 19, wherein the ink container portion has a liquid-contacting face formed of polyolefin.

22. An ink-jet recording apparatus comprising the recording unit of claim 17, wherein the ink employed comprises a dye, water and the components (a), (b), and (c):

(a) at least one surfactant selected from the group consisting of higher alcohol-ethylene oxide adducts represented by general Formula (1), alkylphenol-ethylene oxide adducts represented by general Formula (2), ethylene oxide-propylene oxide copolymers represented by general Formula (3), and acetylene glycol-ethylene oxide adducts represented by general Formula (4), at a content of from 0.1 to 20% by weight;

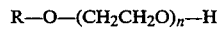
(1)

where R is alkyl, and n is an integer;

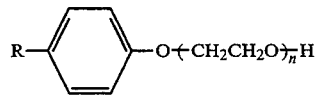
(2)

where R is alkyl, and n is an integer;

$$HO-(CH_2CH_2O)_n-(CHCH_2O)_l-R \quad \text{with } CH_3 \text{ branch} \quad (3)$$

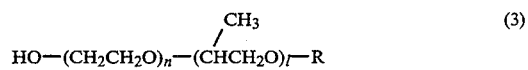

where R is alkyl or hydrogen, and n and l are respectively an integer;

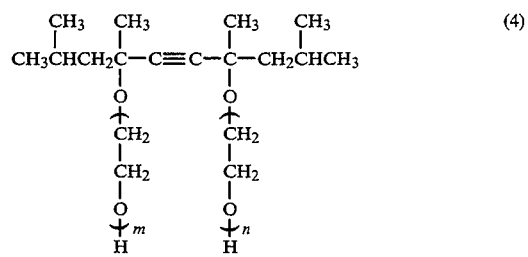
(4)

where m and n are respectively an integer;

(b) thiodiglycol; and (c) urea or a derivative thereof.

23. An ink-jet recording apparatus according to claim 22, wherein the recording unit comprises a carriage.

24. An ink-jet recording apparatus, comprising an ink cartridge of claim 19 and a recording head.

25. An ink-Jet recording apparatus of claim 24, the apparatus further comprises an ink supplying system for supplying ink from the ink cartridge to the recording head.

26. A color ink-jet recording method in which droplets of two or more color inks are ejected in accordance of pulse signals onto adjacent or superposed positions on a recording medium, said ink comprises a nonionic surfactant in an amount of from 1.0 to 20.0% by weight, the ink ejected for one pulse is in an amount of from 10 to 70 pl, and the feathering rate (A) defined by Equation [I] is in the range of from 2.5 to 3.5:

$$A = B/C \quad [I]$$

where B is a diameter (μm) of a dot formed on plain paper, and C is a diameter (μm) of the ejected ink droplet.

27. A color ink-jet recording method according to claim 26, wherein the nonionic surfactant is at least one selected from the group consisting of polyoxyethylene alkyl ether, polyoxyethylene phenyl ether, polyoxyethylene-polyoxypropylene glycol, polyoxyethylene-polyoxypropylene alkyl ether, and acetylene glycol-polyethylene oxide adducts.

28. A color ink-jet recording method according to claim 26, wherein the recording medium has fiber exposed on the surface thereof.

29. An color ink-jet recording apparatus which conducts recording by ejecting droplets of two or more color inks onto adjacent or superposed positions on a recording medium, said apparatus comprises a recording means for conducting recording mode, by use of an ink containing a nonionic surfactant in an amount of from 1.0 to 20.0% by weight, by ejecting the ink for one pulse in an amount of from 10 to 70 pl to form ink dots at the feathering rate (A) defined by Equation [I] is in the range of from 2.5 to 3.5:

$$A = B/C \quad [I]$$

where B is a diameter (μm) of a dot formed on plain paper, and C is a diameter (μm) of the ejected ink droplet.

30. An ink-jet recording apparatus comprising the recording unit of claim 17, wherein the ink employed comprises at least a dye, a water soluble organic solvent, and water, said ink further comprising a compound of the formula.

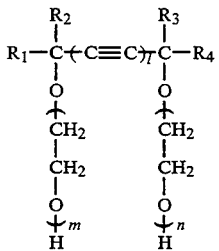
[5]

where $R_1$, $R_2$, $R_3$, and $R_4$ are respectively hydrogen, an alkyl or alkenyl group of 1 to 4 carbon atoms., or a substituted or unsubstituted phenyl group; and m+n is ranging from 0 to 50; and l is a number of 2 or more.

31. An ink-jet recording apparatus according to claim 30, wherein the recording unit comprises a carriage.

* * * * *

UNITED STATES PATENT AND TRADEMARK OFFICE
CERTIFICATE OF CORRECTION

PATENT NO. : 5,395,434

DATED : March 7, 1995

INVENTOR(S) : SHINICHI TOCHIHARA ET AL.

It is certified that error appears in the above-indentified patent and that said Letters Patent is hereby corrected as shown below:

Column 1,

Line 16, "directing" should read --directed--.
Line 29, "ink-Jet" should read --ink-jet--.
Line 33, "mixin-" should read --mixing--.
Line 34, "g(or" should read --(or--.
Line 56, "irrespectively" should read --irrespective--.

Column 3,

Line 14, "an" should read --a--.
Line 20, "another aspect" should be deleted.

Column 8,

Line 10, "wight" should read --weight--.

Column 10,

Line 34, "an" should read --a--.

Column 12,

Line 68, "an" should read --a--.

UNITED STATES PATENT AND TRADEMARK OFFICE
CERTIFICATE OF CORRECTION

PATENT NO. : 5,395,434

DATED : March 7, 1995

INVENTOR(S) : SHINICHI TOCHIHARA ET AL.

It is certified that error appears in the above-indentified patent and that said Letters Patent is hereby corrected as shown below:

<u>Column 17,</u>

Line 10, "are" should read --is--.

<u>Column 18,</u>

Line 16, "5 part" should read --5 parts--.

<u>Column 23,</u>

Line 40, "circle" should read --circular--.

<u>Column 26,</u>
Line 12, insert --where m and n are respectively an integer--.

UNITED STATES PATENT AND TRADEMARK OFFICE
CERTIFICATE OF CORRECTION

PATENT NO. : 5,395,434  Page 3 of 3

DATED : March 7, 1995

INVENTOR(S) : SHINICHI TOCHIHARA ET AL.

It is certified that error appears in the above-indentified patent and that said Letters Patent is hereby corrected as shown below:

Column 28,

Line 27, "ink-Jet" should read --ink-jet--.
    Line 28, "comprises" should read --comprising--.
    Line 34, "of" should read --with--.
    Line 35, "comprises" should read --comprising--.
    Line 56, "An" should read --A--.
    Line 59, "comprises" should read --comprising--.
    Line 64, "is" should be deleted.

Column 29,
    Line 19, "formula." should read --formula--.

Column 30,
    Line 14, "atoms.," should read --atoms,--.

Signed and Sealed this

Twenty-fourth Day of October, 1995

Attest:

BRUCE LEHMAN

Attesting Officer    Commissioner of Patents and Trademarks